United States Patent
Bevington

(10) Patent No.: US 7,091,638 B2
(45) Date of Patent: Aug. 15, 2006

(54) MODULAR END BELL CONSTRUCTION FOR A SUBMERSIBLE MOTOR UNIT

(75) Inventor: Jack Bevington, Ashland, OH (US)

(73) Assignee: Pentair Pump Group, Inc., Golden Valey, MN (US)

( * ) Notice: Subject to any disclaimer, the term of this patent is extended or adjusted under 35 U.S.C. 154(b) by 0 days.

(21) Appl. No.: 10/965,515

(22) Filed: Oct. 14, 2004

(65) Prior Publication Data

US 2006/0082230 A1    Apr. 20, 2006

(51) Int. Cl.
*H02K 5/132* (2006.01)
*F04D 13/08* (2006.01)

(52) U.S. Cl. .................. 310/87; 310/67 R; 310/72; 417/423.3

(58) Field of Classification Search ............... None
See application file for complete search history.

(56) References Cited

U.S. PATENT DOCUMENTS

| | | | |
|---|---|---|---|
| 3,011,083 A * | 11/1961 | Jacob | ............ 310/72 |
| 3,677,665 A | 7/1972 | Corkill | |
| 3,802,806 A | 4/1974 | Blum | |
| 3,849,704 A | 11/1974 | Streater | |
| 4,134,711 A | 1/1979 | Ivins et al. | |
| 4,293,288 A | 10/1981 | Weber | |
| 4,435,661 A | 3/1984 | Witten | |
| 4,437,027 A | 3/1984 | Yamamoto et al. | |
| 4,538,200 A | 8/1985 | Shaikh | |
| 4,614,904 A * | 9/1986 | Yamazaki et al. | ......... 318/793 |
| 4,733,324 A | 3/1988 | George | |
| 4,768,888 A | 9/1988 | McNaull | |
| 4,902,204 A | 2/1990 | Hofstad | |
| 4,923,367 A | 5/1990 | Zimmer | |
| 4,967,303 A | 10/1990 | Yuhasz | |
| 5,003,210 A | 3/1991 | Liu et al. | |
| 5,061,157 A | 10/1991 | Arakawa | |
| 5,211,225 A | 5/1993 | Grosch | |
| 5,417,553 A | 5/1995 | Gibson et al. | |
| 5,765,950 A | 6/1998 | Eno et al. | |
| 6,022,196 A * | 2/2000 | Jensen et al. | ............ 417/44.1 |
| 6,218,754 B1 | 4/2001 | Alekperov et al. | |

(Continued)

FOREIGN PATENT DOCUMENTS

DE           3117475     * 11/1982

(Continued)

OTHER PUBLICATIONS

Kubo, "Subermergible Pump", 08-028489 JPO Patent Abstract, Jan. 30, 1996.*

*Primary Examiner*—Burton Mullins
(74) *Attorney, Agent, or Firm*—Roetzel & Andress, LPA; George W. Moxon, II

(57) ABSTRACT

An end-wall unit for a submersible motor unit and a submersible motor unit for use in driving a pump including a housing that extends along a longitudinal axis and defines an interior chamber, a stator at least partially enclosed by said housing within a stator chamber, a rotor rotatably supported by a bearing assembly and at least partially enclosed by said stator, and an end-wall assembly that includes an end cap and at least one of a capacitor and a bearing assembly. The at least one of the capacitor and the bearing assembly is supported by the end cap in a position such that the at least one of the capacitor and the bearing assembly is at least partially enclosed by the housing when the end-wall assembly is installed on the motor unit.

10 Claims, 4 Drawing Sheets

U.S. PATENT DOCUMENTS

| | | | |
|---|---|---|---|
| 6,359,353 B1 * | 3/2002 | Bevington | 310/87 |
| 6,398,521 B1 | 6/2002 | Yorulmazoglu | |
| 6,515,386 B1 | 2/2003 | Jacobsen | |
| 6,559,566 B1 * | 5/2003 | Modi et al. | 310/89 |
| 6,599,091 B1 | 7/2003 | Nagle | |
| 6,657,338 B1 * | 12/2003 | Fisher et al. | 310/89 |
| 6,831,382 B1 * | 12/2004 | Lyle et al. | 310/89 |
| 2002/0171301 A1 * | 11/2002 | Neri | 310/68 R |

FOREIGN PATENT DOCUMENTS

| | | | |
|---|---|---|---|
| DE | 4314453 | * | 11/1994 |
| JP | 10-94211 | * | 4/1998 |

* cited by examiner

MODULAR END BELL CONSTRUCTION FOR A SUBMERSIBLE MOTOR UNIT

FIELD OF THE INVENTION

The invention relates generally to This invention relates to a submersible motor unit used in submersible pump applications. The present invention relates to a unitary construction of an end bell, in combination with a bearing, a bearing housing, and an annular capacitor, which provides a modular end cap assembly greatly increasing the ease of assembling a submersible pump.

BACKGROUND OF THE INVENTION

Dwellings located in rural areas are often not supplied with fresh water by a public utility. In such cases, fresh water can be pumped from a well and delivered to the dwellings via a plumbing network. To extract well water from the well, however, a pump and a motor for driving the pump must be used to impart a force on the water sufficient to elevate the water out of the well and into the dwelling.

Pumps and motors are known to be submerged in the well water, and any other fluid, to be removed from a reservoir. The housing of submersible motors encloses the internal components of the motor and protects those components from the ambient aquatic environment. Motors that employ a capacitor to assist during the starting of the motor have conventionally had the capacitor externally coupled to a bottom of the motor housing. This requires apertures to be formed in the motor housing through which conducting leads can extend to receive electrical energy from an electrical-energy transmission network. These apertures can damage the integrity of the motor's housing, and provides additional locations where the fluid from the ambient environment can enter the interior of the motor housing.

Attempts to internally install the capacitor within the motor housing, such as in U.S. Pat. No. 6,359,353 to Bevington, which is the subject of Reissue patent application Ser. No. 10/797,931 and incorporated in its entirety by reference herein, have successfully eliminated the apertures in the motor housing through which conducting leads must extend. However, properly positioning the capacitor within the motor housing has complicated the installation process.

Similarly, conventional installation of a bearing assembly within a motor housing requires time and skill to ensure that the bearing assembly is properly situated to rotatably support a rotating member such as the rotor or the drive shaft. Conventional motors include dedicated support assemblies that are installed to support the bearing assembly at a desired location within the motor unit. The dedicated support assemblies are in addition to the existing components of the motor, and increase the number of parts and complexity of the motor, making installation more costly.

Accordingly, there is a need in the art for a submersible motor unit with an internal capacitor that can be easily installed within the interior of the motor housing, and a motor unit that facilitates simplified installation of the bearing assembly. The motor unit should simplify the overall assembly process, and should minimize the cost of assembly.

SUMMARY OF THE INVENTION

It is an objective of the present invention to minimize the cost of assembling a submersible motor unit. It is a further object of the present invention to minimize the dedicated to ease installation of at least one of a capacitor and a bearing assembly within the motor unit.

The present invention achieves these and other objectives by providing, in accordance with one aspect, a submersible motor unit for use in driving a pump. The submersible motor unit comprises a housing that extends along a longitudinal axis and defines an interior chamber, a stator at least partially enclosed by said housing within a stator chamber, a rotor rotatably supported by a bearing assembly and at least partially enclosed by said stator, and an end-wall assembly comprising an end cap and a capacitor. The capacitor is supported by the end cap in a position such that the capacitor is at least partially enclosed by the housing when the end-wall assembly is installed on the motor unit.

In accordance with another aspect, the present invention provides a submersible motor unit for use in driving a pump. The submersible motor unit comprises a housing that extends along a longitudinal axis and defines an interior chamber, a stator at least partially enclosed by said housing within a stator chamber, a rotor rotatably supported by a bearing assembly and at least partially enclosed by said stator, and an end-wall assembly comprising an end cap and a bearing assembly. The bearing assembly is coupled to the end cap and is supported in a position that is at least partially enclosed by the housing when the end-wall assembly is installed on the motor unit.

In accordance with another aspect, the present invention also provides an end-wall assembly to be provided at a terminus of a submersible motor unit housing. The end-wall assembly comprises an end cap comprising a generally-tubular hub and a flange extending from the hub to at least partially define a chamber, and a capacitor to be supported within the chamber by the end cap. The capacitor supported within the chamber of the end cap is positioned to be at least partially enclosed by the housing when the end-wall assembly is installed on the motor unit.

In accordance with yet another aspect, the present invention also provides an end-wall assembly to be provided at a terminus of a submersible motor unit housing. The end-wall assembly comprises an end cap comprising a generally-tubular hub and a flange extending from the hub to at least partially define a chamber, and a bearing assembly to be disposed within an interior of the hub. The bearing assembly supported within the interior of the hub is positioned to rotatably support at least one of a rotor and a drive shaft of the motor unit when the end-wall assembly is installed on the motor unit.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTIONS OF PREFERRED AND ALTERNATE EMBODIMENTS

Figure 1:
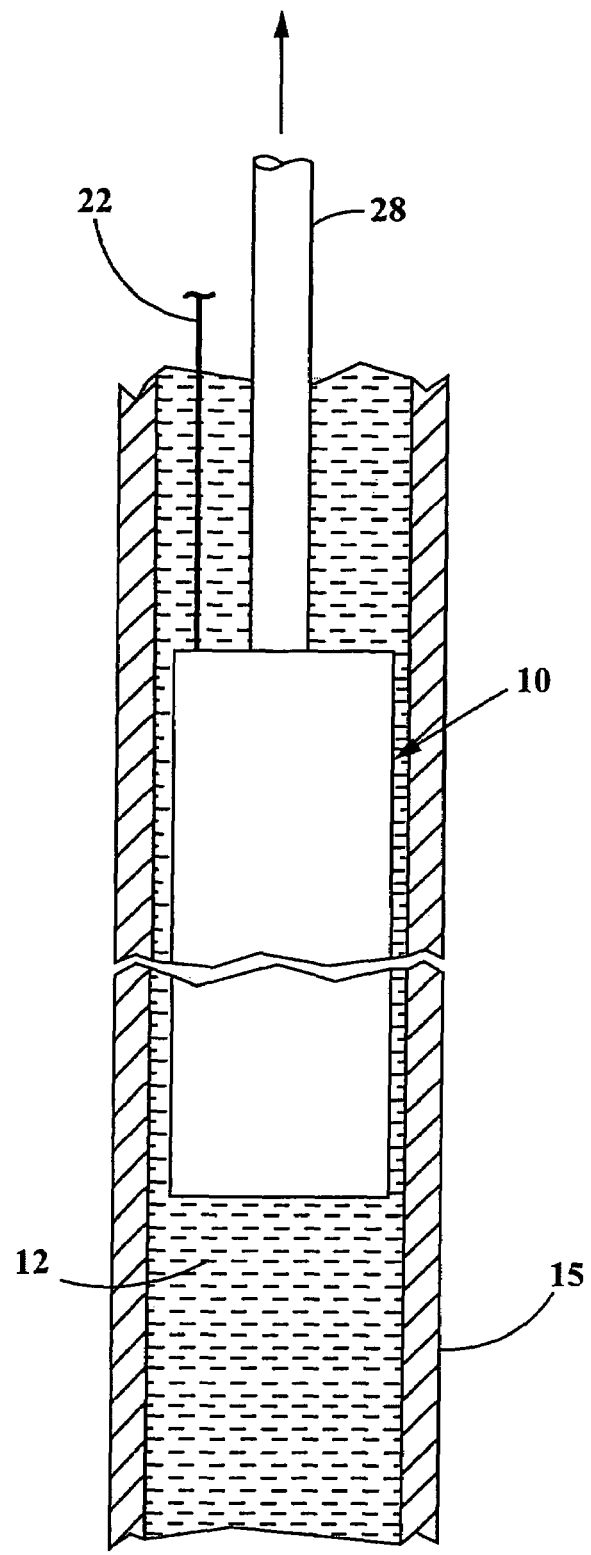
FIG. 1 is a schematic illustration of a submersible application in which a submersible motor unit and pump of the present invention are submerged in a liquid medium.

Certain terminology is used herein for convenience only and is not to be taken as a limitation on the present invention. Further, in the drawings, certain features may be shown in somewhat schematic form.

FIG. 1 shows a schematic illustration of a submersible motor unit and pump assembly 10 submerged in a liquid medium 12. FIG. 1 illustrates a common application wherein the motor unit and pump assembly 10 is submerged within water 12 contained within a cylindrical well 15 or pipe. Although described herein as being submerged in water 12 within a well 15, the submersible motor 18 of the present invention can be submerged in a variety of liquids for a variety of applications.

Electrical energy is transmitted to the motor unit 18 by a conductive line 22 that communicates with an electrical outlet or other external source of electrical energy (not shown). When the motor unit 18 is energized by the electrical energy, the motor unit 18 operates the pump 25 to impart sufficient force on the water 12 to pump the water 12 from the well 15 or pipe out through a discharge conduit 28.

Figure 2:
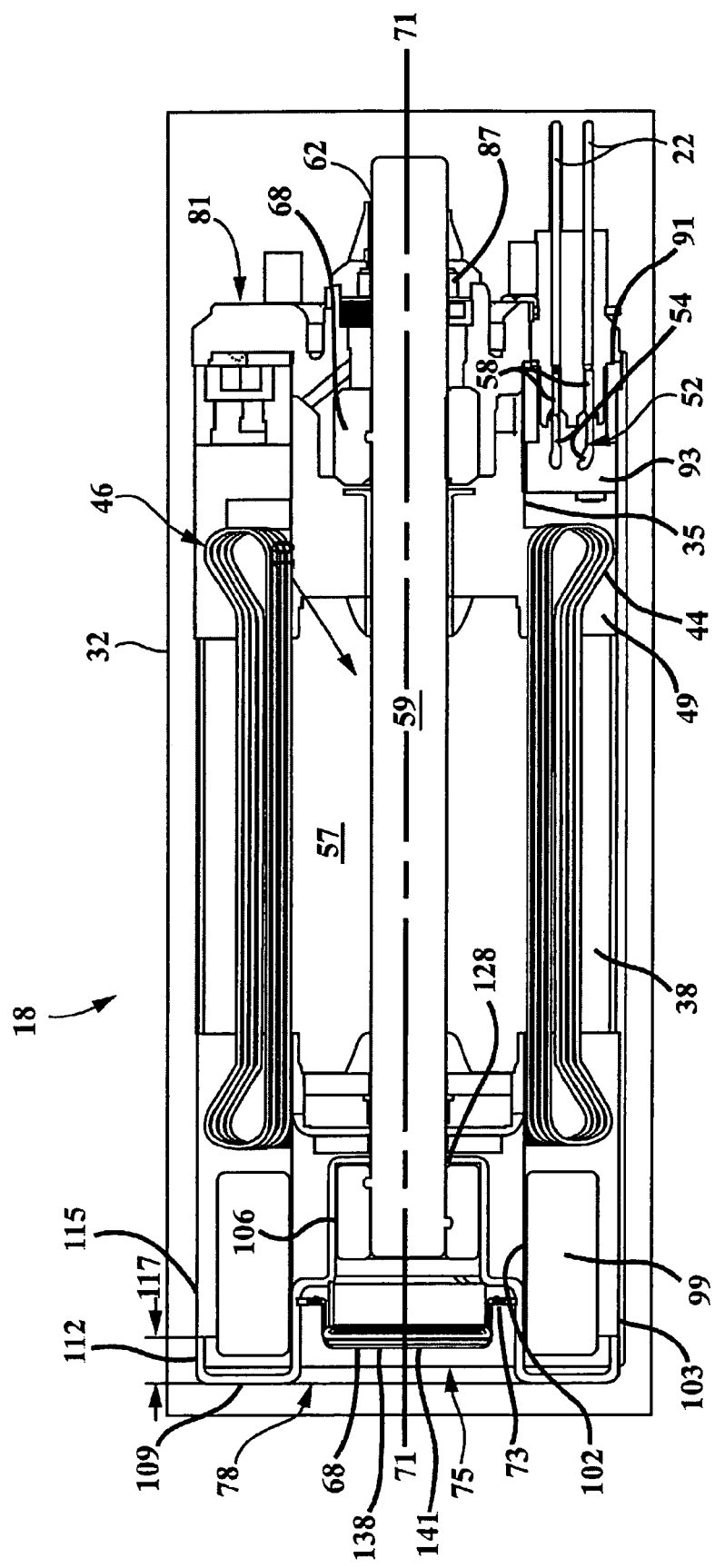
FIG. 2 is a cross-sectional view of a portion of the submersible motor unit and pump assembly shown in FIG. 1 taken along line 2—2.

A cross-sectional view of a portion of the submersible motor unit and pump assembly 10 taken along line 2—2 is shown in FIG. 2. The portion of the motor unit and pump assembly 10 shown in FIG. 2 is mainly limited to features of the motor unit 18 detached from the pump 25. The motor unit 18 includes a generally-cylindrical, or other suitably-shaped housing 32 that can be formed of any generally rigid and durable material. Nonlimiting examples of such materials include electrically conducting materials such as a metal, metal alloy, and the like, as well as plastics and other composites that do not conduct electricity. For housings 32 made from non-conducting materials, a dissipating conductor must be provided to safely divert unexpected and stray currents from the motor unit 18 to ground when such unpredictable conditions occur.

A cylindrical inner member 35 is disposed in a coaxial relationship with and is enclosed by the cylindrical housing member 32. When placed in their coaxial relationship, the inner member 35 and the housing 32 form an annular stator chamber 38 that surrounds a cylindrical chamber referred to herein as the rotor chamber 41.

A plurality of stator windings 44 are coiled within the stator chamber 38 to form a stator 46. The stator 46 is insulated from the inner member 35 and the housing 32 by a potting compound 49 that can be any electrically-insulative material. Nonlimiting examples of suitable electrically-insulative materials include plastics, plastic composites, electrical-insulating liquids, and any other material that will minimize the conduction of electricity from the stator 46 to the inner member 35 and the housing 32. Electrical energy transmitted to the motor unit 18 via the conductive line 22 is transmitted to the stator 46 by a power-wire assembly 52 that includes an electric conductor 54 extending between the stator 46 and the conductive line 22. A pin 58 or a plurality of pins 58 can also be provided to the motor unit 18 to form a plug or interface that is compatible with a similar feature at the terminus of the conductive line 22. According to this embodiment, the plug provided to each of the motor unit 18 and the conductive line 22 mate to establish an electrical connection through which electrical energy can be transmitted to the stator 46.

A rotor 57 is rotatably supported within the rotor chamber 41 such that the stator 46 extends around and is coaxial with the rotor 57. As is well known in the art of electric motors, electrical energy conducted by the stator windings 44 generates an electromagnetic force that induces rotation of the rotor 57 within the rotor chamber 41. A drive shaft 59 is operatively coupled to the rotor 57 such that rotation of the rotor 57 imparts a force causing rotation of the drive shaft 59, which extends through an aperture 62 in an end wall 65 of the motor unit 18. Although alternate arrangements are within the scope of the present invention, the embodiment shown in FIG. 2 includes a pair of bearing assemblies 68, with each bearing assembly 68 located at opposite ends of the motor unit 18 along the longitudinal axis 71, and the rotor 57 coupled to the drive shaft 59 at an intermediate position between the bearings 68.

In order to minimize any tendency for the motor unit 18 to leak, the rotor chamber 41 can be filled with a liquid which is maintained at the same pressure as the liquid 12 (FIG. 1) in which the pump and motor assembly 10 is submerged. To enable the pressure of the liquid 12 in which the pump and motor assembly 10 is submerged to be transmitted to the liquid in the rotor chamber 41, a circular flexible diaphragm 73 extends across a circular opening 75 in a first end-wall assembly 78.

The first end-wall assembly 78 is connected to one end of the housing 32 and a second end-wall assembly 81 is connected to the other end of the housing 32. Communication can also be established between the first and second end-wall assemblies 78, 81 and internal features of the motor 18, such as the inner member 35 for example, to establish generally water-tight connections therebetween. These water-tight connections can separate the various features and chambers within the motor 18, such as the stator chamber 38 and rotor chamber 41, located radially inward of the housing 32. Other features and chambers within the housing 32 can optionally be separated as desired.

Although the first and second end-wall assemblies 78, 81 enclose the interior of the motor unit 18 at each end, an apperture 62 formed in at least one of the first and second end-wall assemblies 78, 81 allows the drive shaft 59 to extend from within the rotor chamber 41 to the pump unit 25 externally of the housing 32. One or more seals 87, such as an O-ring can be provided adjacent to the aperture 62 in the end-wall assembly 78, 81 through which the drive shaft 59 extends. The one or more seals 87 minimize the flow of water 12 through the aperture 62 and into the interior of the housing 32.

A similar apperture 91 can be formed in at least one of the first and second end-wall assemblies to facilitate electrical communication between the conductive line 22 and the stator 46. One or more seals 93 adjacent to the aperture 91 minimize the influx of water 12 therethrough. In the embodiment shown in FIG. 2, a plug provided to the conductive line 22 cooperates with a set of pins 58 that extend through an insulating member 96 that acts as a seal 93 to minimize the flow of water 12 into the interior of the housing 32 through the aperture 91.

Optionally, a capacitor 99 can be disposed within the housing 32 of the assembled motor unit 18 to store electrical energy to be utilized during starting of the motor unit 18. Thus, the motor unit 18 can be of the known permanent split-capacitor type, which utilizes energy from the capacitor 99 during starting. The capacitor 99 shifts the phase of electrical energy transmitted to the stator 46, thereby creating additional torque to aid in the rotation of the rotor 57, and accordingly, the drive shaft 59 as the motor unit 18 is being started. The capacitor 99 remains in the circuit during steady-state operation of the motor unit 18 to store electrical energy to aid in a subsequent starting operation.

The capacitor 99, when present, is operatively connected to receive electrical energy delivered to the motor unit 18 by the conductive line 22. Additionally, the capacitor 99 is also operatively connected to deliver the phase-shifted electrical energy to the stator 46 during a time when the motor unit 18 is being started.

According to one embodiment, the capacitor 99 is an annular capacitor that extends coaxially around longitudinal axis 71 when the motor unit 18 is assembled. The annular capacitor has cylindrical inner and outer side surfaces 102, 103, which are disposed in a coaxial relationship. When installed within the motor unit 18, the inner and outer side surfaces 102, 103 are disposed in a coaxial relationship with the housing 32 and the tubular inner member 35. In this manner, the capacitor 99 is located adjacent to a terminal end of the housing 32 within a channel 115 defined at least in part by the housing 32 and one of the end-wall assemblies 78, 81 when the motor unit 18 is assembled.

Figure 3:
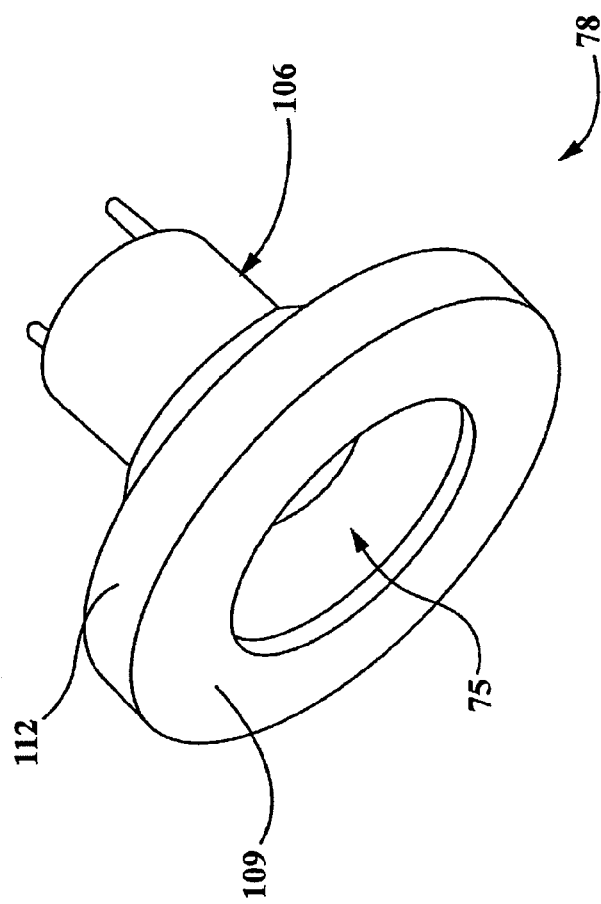
FIG. 3 is a perspective view of an end-bell assembly of the present invention to be provided at a terminus of the submersible motor unit for supporting at least one of a bearing assembly and a capacitor.

FIG. 3 shows a perspective view of a first end-wall assembly 78 of the present invention to be coupled to the housing 32 of the submersible motor unit 18 for receiving at least one of a bearing assembly 68 and a capacitor 99. The end-wall assembly 78 includes a generally-tubular hub 106 and a flange 109 coupled to an end of the hub 106. Optionally, a coupling member such as an annular side wall 112 can be provided to the flange 109 to facilitate the connection of the end-wall assembly 78 to the housing 32 of the motor unit 18. The flange 109, and the side wall 112, if present, form a portion of a channel 115 in which the capacitor 99 can be located adjacent to the end of the housing 32 to which the end-wall assembly 78 is to be connected, as shown in the assembled motor unit 18 of FIG. 2.

For embodiments where the side wall 112 is present and extends from the flange 109, it is worth noting that when the end-wall assembly 78 is installed on the motor unit 18, the side wall 112 is considered to be an extension of the housing 32, and thus, becomes an extension 117 of the housing 32. In other words, when the end-wall assembly 78 is installed, the housing 32 of the present invention includes not only the generally-cylindrical housing 32, but also the added length provided by the extension 117.

Figure 4:
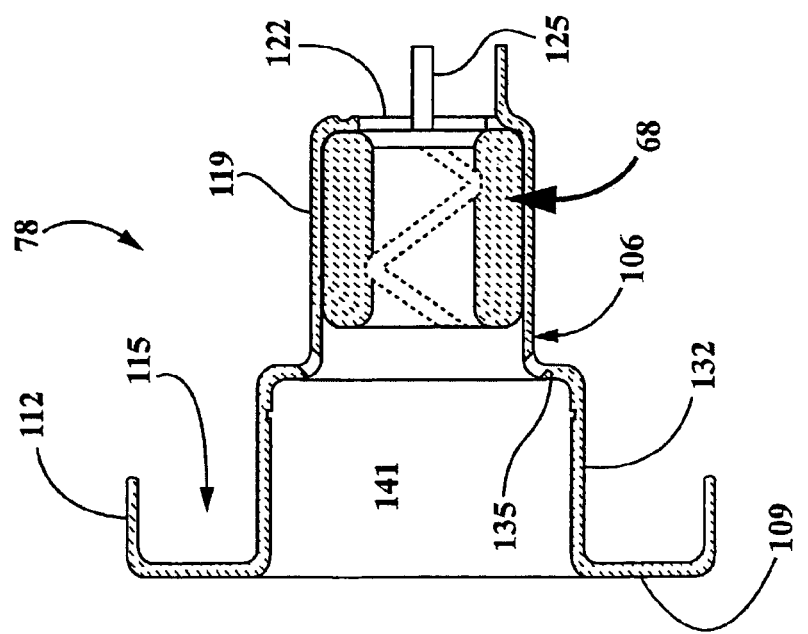
FIG. 4 is a cross-sectional view of the end-bell assembly shown in FIG. 3 taken along line 4—4.

The hub 106 of the end-wall assembly 78 can include one or more inner diameters, as shown in FIG. 4. In FIG. 4, a first section 119 has a first inner diameter sized to receive a bearing assembly 68. The bearing assembly 68 can be any type of bearing assembly 68 that can rotatably support the drive shaft 59. Preferred bearing assemblies 68, such as thrust bearings, also resist axial movement of the drive shaft 59 during operation of the motor unit 18. The first section 119 is also provided with an apperture 122 through which the drive shaft 59 (FIG. 2) or a fastener 125 (FIG. 4) for coupling the drive shaft 59 to the bearing assembly 68 can extend. One or more seals 125 (FIG. 2) are provided adjacent to the apperture 122 in the first section 119 of the hub 106 to minimize the leakage of fluid or other possible contaminants into or out of the bearing assembly 68.

According to the embodiment of the end-wall assembly 78 shown in FIG. 4, a second section 132 has a second inner diameter that is different than the first inner diameter and is coupled to the first section by a transition region 135. The second inner diameter is larger than the first inner diameter, but the opposite is also within the scope of the present invention. The inner diameter of the second section 132 is suitably sized to receive a set of thrust pins 138 or other fastener that secures the bearing assembly 68 at a desired axial position within the first section 119. A cover 141 is also provided as a seal to minimize the leakage of fluids or other possible contaminants into and out of the first section 119 of the hub 106. In contrast to the embodiment shown in FIG. 2, the end-wall assembly 78 does not include the capacitor 99 located within the channel 115. Accordingly, the channel 115 can optionally be adapted or eliminated from embodiments where the capacitor 99 is not to be located adjacent to the end-wall assembly 78.

Figure 5:
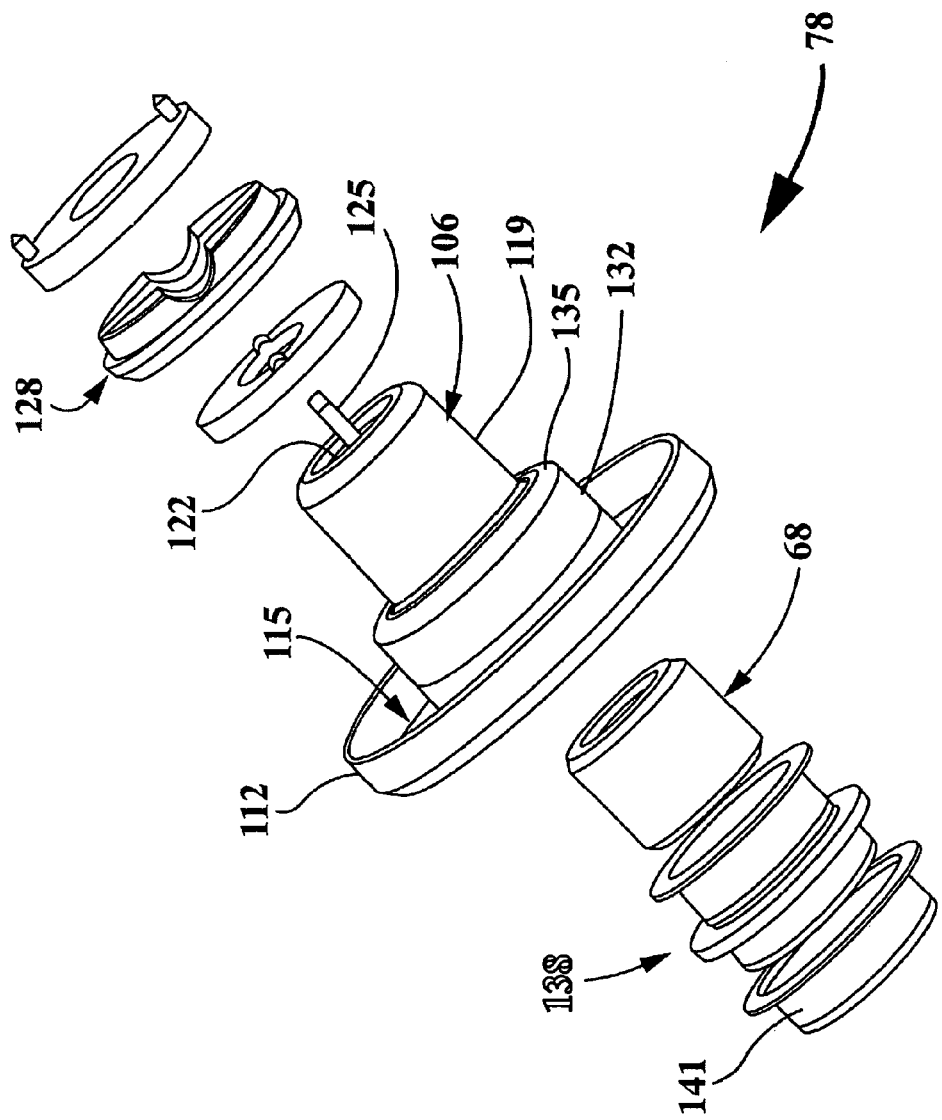
FIG. 5 is an exploded view of the end-bell assembly shown in FIG. 3.

FIG. 5 is an exploded view of the end-wall assembly 78 and bearing assembly 68 shown in FIGS. 3 and 4. An annular channel 115 is formed by the arrangement of the hub 106 and flange 109, and optionally the side wall 112, to receive the capacitor 99. Thus, the end-wall assembly 78 of the present invention can receive at least one of the capacitor 99 and the bearing assembly 68, or both simultaneously.

It is worth noting that locating the capacitor 99 within the channel 115 does not necessarily require the end-wall assembly to support the capacitor 99 within the assembled motor unit 18. The capacitor 99 can be physically supported by suspending or otherwise locating the capacitor 99 within the channel 115. According to another embodiment of the present invention, the capacitor 99 can also be physically supported within the channel 115 inside the motor unit 18 by the end-wall assembly 78. According to yet another embodiment, at least one of the capacitor 99 and the bearing assembly 68 is coupled within the channel 115 or hub 106, respectively, prior to the installation of the end-wall assembly 78 onto the motor unit 18. According to this embodiment, the capacitor 99 and/or the bearing assembly 68 are integrally formed as part of the end-wall assembly 78 to be installed onto the motor unit 18.

The side wall 112 can be used to couple the end-wall assembly 78 to the housing 32 of the motor 18. To form a seamless connection between the housing 32 and the end-wall assembly 78 a surface of the side wall 12 can be placed adjacent and welded to a surface of the housing 32. Preferably, the side wall 112 is inserted internally of, and placed in contact with the inner periphery of the housing 32, thus forming a generally-secure connection between the end-wall assembly and the housing. Welding the side wall to the housing results in a seamless connection that minimizes the leakage of fluid into and out of the motor unit at the point of that connection.

Alternate embodiments include a connection between the housing 32 and the end-wall assembly 78 that is secured by at least one of a mechanical fastener; chemical fastener such as an adhesive or epoxy; compatible threaded portions, wherein one threaded portion is provided to each of the housing 32 and the side wall 112 of the end-wall assembly 78; and the like. Other embodiments include a removable connection between the housing 32 and the side wall 112 of the end-wall assembly 78. Such removable connections can be established with mechanical fasteners such as screws, bolts, compatible threaded portions, and other fasteners that can be removed and replaced.

Although shown and described above as defining a plurality of different inner diameters, the hub 106 of the end-wall assembly 78 can also define one inner diameter without departing from the scope of the present invention. According to this embodiment, the bearing assembly 68 is secured in place within the hub 106 by fasteners such as compatibly-threaded portions provided to the bearing assembly 68 and the inner periphery of the hub 106, snap rings, and the like, and the cover 141 is positioned adjacent to the bearing assembly 68 as a seal to minimize the leakage of a fluid or other possible contaminant into and out of the interior of the hub 106.

By locating at least one of the capacitor 99 and the bearing assembly 68 adjacent to the end-wall assembly 78 within the motor unit 18 in a coaxial arrangement with axis 71, the overall size of the motor unit 18 is minimized.

A method of forming a motor unit 18 according to the present invention includes the steps of providing a housing 32, forming a rotor chamber 41 radially inward of a stator chamber 38, providing a stator 46 within the stator chamber 38, forming an end-wall assembly 78 for receiving at least one of a capacitor 99 and a bearing assembly 68, and coupling an end-wall assembly 78 to a motor housing 32. A cover 141 can be installed adjacent to the bearing assembly 68 and any fasteners used to secure the bearing assembly in place to minimize the leakage of liquid and other possible contaminants into and out of the motor unit.

One embodiment of the method can further include the step of securing a bearing assembly 68 within the hub 206 of the end-wall assembly 78 as described above for rotatably supporting a drive shaft 59 within the motor unit 18. Another embodiment of the method includes the step of locating a capacitor 99 within a channel 115 of the end-wall assembly 78 when the motor unit 18 is assembled. Coupling the end-wall assembly 78 to the housing 32 of the motor unit 18 positions the capacitor 99 within the housing 32, and for the annular capacitor 99, in coaxial relationship with the housing 32.

From the above description of the invention, those skilled in the art will perceive improvements, changes and modifications. Such improvements, changes and modifications within the skill of the art are intended to be covered by the appended claims.

What is claimed is:

1. A submersible motor unit for use in driving a pump comprising:
    a housing that extends along a longitudinal axis and defines an interior chamber;
    a stator at least partially enclosed by said housing within a stator chamber;
    a rotor rotatably supported by a bearing assembly and at least partially enclosed by said stator; and
    an end-wall assembly comprising a hub with a flange that defines at least a portion of a channel for receiving a capacitor, wherein a bearing assembly is coupled to the hub and the hub comprises a plurality of segments each having a plurality of different inner diameters, wherein each segment of the hub having different inner diameter is separated by a transition region, and
    wherein the capacitor is located adjacent to the end-wall assembly and within the chamber when the end-wall assembly is installed on the motor unit such that the capacitor is at least partially enclosed by the housing.

2. The motor unit according to claim 1, wherein the capacitor is integrally formed as part of the end-wall assembly.

3. The motor unit according to claim 1, wherein the capacitor is an annular capacitor that extends around the hub of the end-wall assembly when located within an annular chamber defined at least in part by the flange extending from the hub.

4. The motor unit according to claim 1, wherein the bearing assembly is at least partially enclosed within an interior periphery of the hub of the end-wall assembly.

5. The motor unit according to claim 4, wherein the bearing assembly is at least partially separated from the stator chamber by the end cap.

6. The motor unit according to claim 1 further comprising a cover positioned adjacent to the bearing assembly to minimize the passage of a fluid into or out of the interior periphery of the hub.

7. An end-wall assembly to be coupled to a submersible-motor-unit housing, the end-wall assembly comprising:
    a generally-tubular hub and a flange extending from the hub to at least partially define a channel;
    a chamber defined by an interior periphery of the hub in which a bearing assembly is to be coupled to rotatably support a drive shaft when the submersible motor unit is assembled,
    wherein the hub comprises a plurality of segments each having a plurality of different inner diameters, wherein each segment of the hub having a different inner diameter is separated by a transition region, and
    a capacitor to be located within the channel when the end-wall assembly is coupled to the submersible-motor-unit housing.

8. The end-wall assembly according to claim 7, wherein the capacitor is an annular capacitor that extends circumferentially around the hub when located within the chamber.

9. The end-wall assembly according to claim 7, wherein the bearing assembly is to be located within a segment of the hub having a first inner diameter and a cover is coupled to a segment of the hub having a second inner diameter to minimize the passage of a fluid into, out of, or both into and out of the bearing assembly.

10. A submersible pump assembly comprising:
    a pump comprising a rotatable impeller for imparting a force to elevate the pressure of a fluid drawn into the pump;
    a motor for generating a rotational force to rotate the impeller; and
    means for operatively coupling the motor to the pump to transmit the rotational force from the motor to the impeller, wherein
        the motor comprises an end-wall assembly comprising a hub with a flange that defines at least a portion of a channel for and receiving a capacitor and includes means for receiving at least one of a capacitor and a bearing assembly coupled to the hub, and
    wherein the hub comprises a plurality of segments each having a plurality of different inner diameters, wherein each segment of the hub having a different inner diameter is separated by a transition region.

* * * * *